United States Patent Office 3,420,590
Patented Jan. 7, 1969

---

3,420,590
DUSTPROOF BEARING FOR IDLER ROLLER
Georges A. Bilocq, Plessisville, Quebec, Canada, assignor to Forano Limited, Plessisville, Quebec, Canada
Filed Oct. 31, 1966, Ser. No. 590,735
U.S. Cl. 308—187    7 Claims
Int. Cl. F16c *1/24;* F16c *33/78*

ABSTRACT OF THE DISCLOSURE

A dustproof bearing for idler roller. Within the end-bore chamber of the pulley, and over the external end of the fixed shaft, there is formed a sealed labyrinth channel as follows. The bearing assembly is first mounted over the shaft until it reaches the end of the end-bore chamber. Next, an annular ring is mounted over the shaft, and over the annular ring, there is provided a first means to define a lubrication channel, which is constructed to allow the lubricant to circulate in one direction toward the external end of the channel but which closes the channel when the lubricant circulates in the opposite direction. At the outer end of the shaft, there is a cylindrical retaining member which is arranged to retain the bearing against axial movement along the shaft. Over the cylindrical retaining member, there are provided a plurality of spaced annular elements which define the remaining portion of the lubrication channel and are all contained inside an annular retaining ring which terminates in an external inwardly depending flange abutting the cylindrical member at the external end thereof.

---

Figure 1:
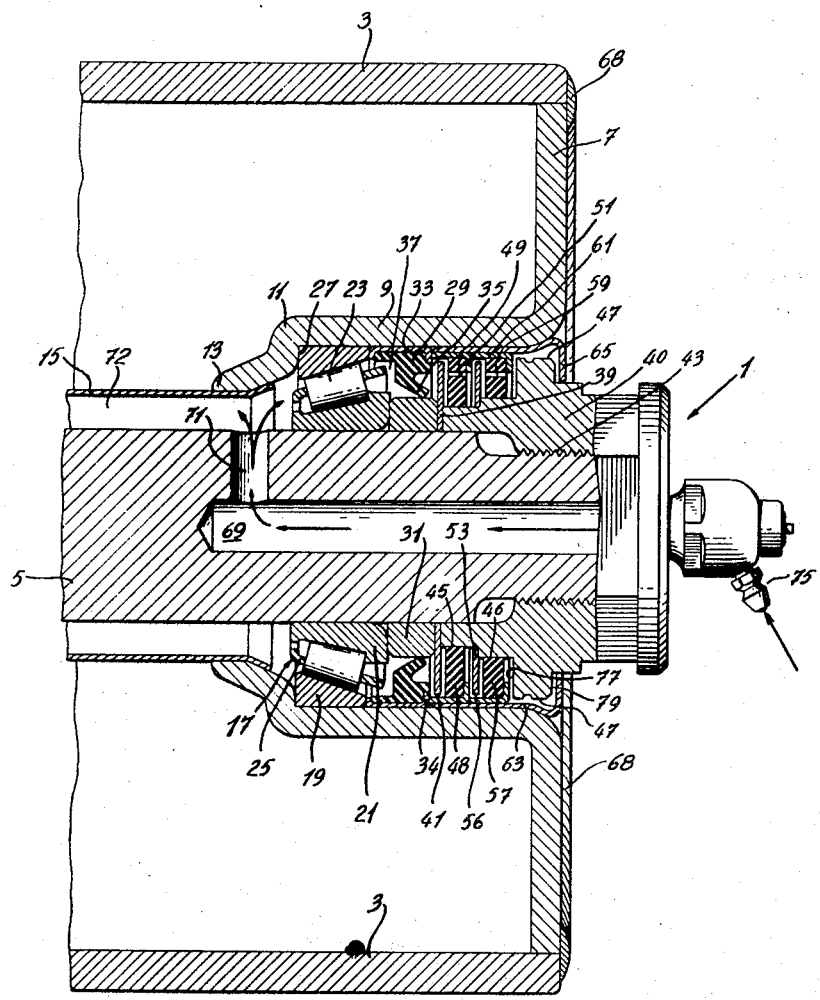

This invention relates to a dustproof bearing for idler roller. More particularly, the invention is directed to the structure of a dustproof, grease sealed and bearing mounted combination of a core and of a rotatable roller shell thereabout.

In a bearing assembly provided with a grease chamber, there is usually present the problem of impurities entering the chamber and contaminating the lubricant, thus damaging the bearing assembly. This problem is particularly acute when the bearing assembly is used on a conveyor adapted to handle highly abrasive and dusty materials.

It has been found that the above disadvantages may be overcome by providing in an idler roller combination of the type including a pulley having a cylindrical central bearing support mounted over a stationary shaft coaxial with said support, said pulley formed with a central end-bore defining chamber, a bearing over said shaft supporting said pulley and at the internal end of said bore, means to introduce lubricant under pressure within said chamber and retainer means at the external end of said chamber to prevent axial movements of said bearing, an improved dustproof bearing assembly provided with first means adjacent the external end of said bearing but spaced therefrom to define therewith a lubrication channel, means to close said channel when the lubricant circulates in one direction toward the end of said channel, but capable of opening when the lubricant circulates in the opposite direction, and means adjacent said first means and defining therewith a labyrinth channel for injecting said lubricant under pressure.

Figure 2:
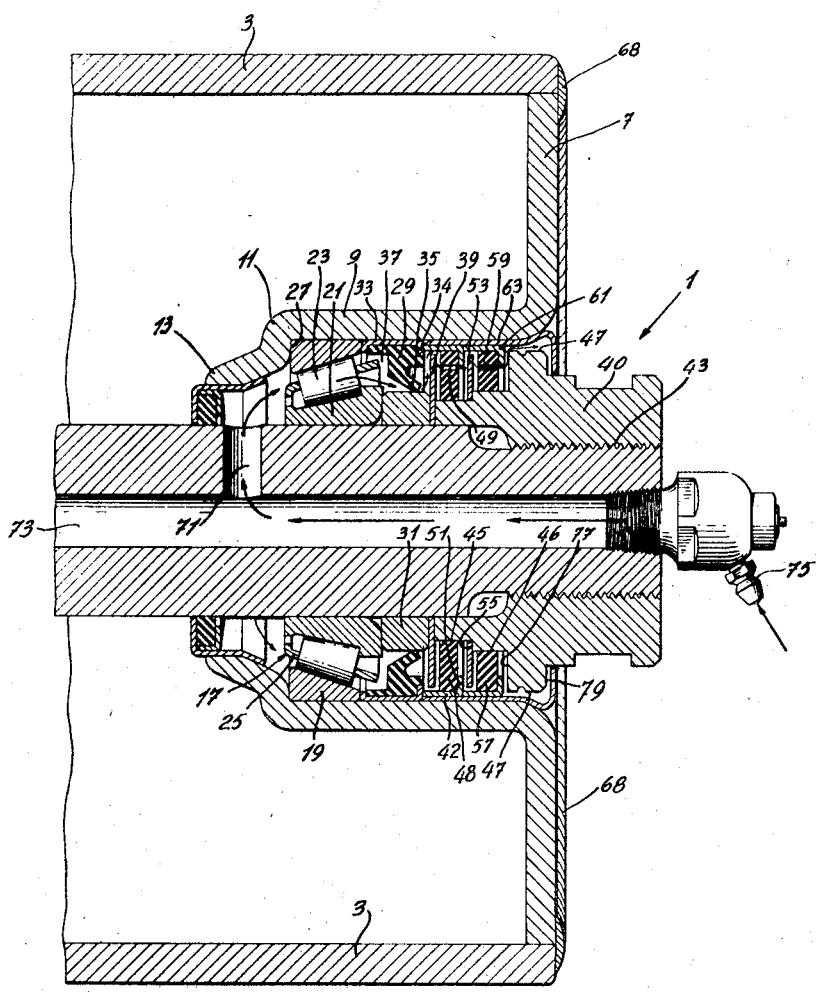

In the drawings, which illustrate embodiments of the invention,

FIGURE 1 is a partial longitudinal cross-section of one embodiment according to the invention; and FIGURE 2 is a partial longitudinal cross-section of another embodiment according to the invention.

Referring to FIGURE 1, the idler roller according to the invention is generally indicated at 1. It comprises a pulley 3 which is adapted to be mounted over a shaft 5. The pulley 3 has an outer radial portion 7 and a tubular inwardly extending section 9 offset at 11 and terminating in a radially inwardly directed lip 13 abutting the central bore 15 of the pulley 3. The tubular inwardly extending section 9 defines with shaft 5 a chamber for mounting the bearing assembly according to the invention.

The bearing 17 is conventional and comprises outer bearing race 19, inner bearing race 21, roller 23 and roller retainer 25. Bearing 17 is mounted about shaft 5 to abut bore end 27 on the tubular inwardly extending section 9. Adjacent the bearing 17 there is provided an annular lip-type plastic seal 29 preferably made of Teflon (registered trademark for polytetrafluoroethylene) mounted between an inner metal spacer 31 and an outer annular retaining ring 33 having a flange 34 at the external end thereof. The annular lip-type plastic seal 29 comprises a lip portion 35 inwardly slanted and having its tip 36 just barely touching the metal spacer 31. The annular seal therefore forms on one side thereof the first portion 37 of the lubrication channel. It will be easily realized that by introducing a lubrication material under pressure within the channel, the lip 35 will be forced open to facilitate the injection of lubricant into the channel and will reduce the pressure on the other side of the annular lip-type seal as will be more particularly explained hereunder.

The bearing assembly further comprises a metal disc 39 fixedly mounted around shaft 5 between metal spacer 31 and the retaining member 40. The metal disc 39 has a clearance 41 between the outer periphery thereof and a retaining ring 42. As illustrated in the drawings in FIGURES 1 and 2, the retaining member 40 is screwed in the threaded portion 43 at the external end of shaft 5. It will therefore be realized that the metal disc 39, the metal spacer 31 and the bearing 17 will be more or less resting firmly one against another by varying the adjustment of the retaining member 40. Referring again to FIGURES 1 and 2, it will be seen that the retaining member 40 comprises three portions 45, 46 and 47 having increasing diameters. The portion 45 having the smallest diameter is provided thereabout with a plastic seal 48 provided with a grease hole 49. It will be seen that the plastic seal 48 is spaced from metallic disc 39 so as to define therebetween a further portion of the lubrication channel. The plastic seal 48 is mounted within a second annular retaining ring 42 having a flange 51 at the external end thereof which rests at the opposite end thereof against the flange 34 of the first retaining ring 33. A second metallic disc 53 is also mounted about the first portion 45 of the cylindrical retaining member 40 and is arranged to snugly fit against the shoulder 55 separating first and second portions 45 and 46 of the retaining member 40. This second metallic disc 53 has a clearance 56 at its outer periphery to define a further extension of the lubrication channel. Another plastic seal 57 is mounted around the second portion 46 of the cylindrical retaining member 40. This plastic seal is also provided with a grease hole 59 and is disposed on said second portion 46 of said retaining member 40 to define through hole 59 and on each side of the plastic seal 57 a continuation of the lubrication channel. The plastic seal 57 is mounted within another retaining ring 61 abutting at one end thereof against the flange 51 of retaining ring 42. The bearing assembly finally comprises a retaining ring 63 around both retaining rings 42 and 61 and the larger portion 47 of the retaining member 40. The retaining ring 63 is terminated at its external end in an inwardly depending flange 65 abutting the retaining member 40. At its internal end, the retaining ring has a flange 66 separating outer race 19 and the annular lip-type plastic seal 29. The outer radial portion 7 is welded on the pulley 3 at 68.

The shaft 5 is provided with an axial lubricant passage 69 for injecting lubricant material within the bearing assembly according to the invention. In the embodiment according to FIGURE 1, the axial passage 69 is terminated by a transverse passage 71 leading to the bearing assembly and into a third passage 72 between the shaft 5 and the bore 15 of pulley 3 leading to a second bearing assembly at the opposite end of the idler roller 1. In the second embodiment illustrated in FIGURE 2, the lubricant passage extends all the way through the shaft 5, so that in both embodiments it is possible to have a grease fitting 75 at one end only of the idler roller.

Referring again to the drawing, the bearing assembly defines a lubrication channel as follows. The lubricant material entering either through lubricant passages 69 or 73 and through the second passage 71 is forced with pressure through the bearing 17 into a first channel at the internal end of the annular lip-type plastic seal 29. Once the lubricant material has reached the lip portion 35 of the lip seal 29 it forces opening of the channel by displacing the tip 36 of the lip 35 away from the metal spacer 31. When no pressure is exerted on the lip 31, the channel is closed again to prevent any reentry of the lubricant material within the first portion of the channel. The second portion of the labyrinth lubrication channel is as follows:

(1) vertically between lip-seal 29 and metal disc 39;
(2) horizontally at the clearance 41 between disc 39 and retaining ring 42;
(3) vertically between disc 39 and plastic seal 48;
(4) horizontally through grease hole 49 in plastic seal 48;
(5) vertically between plastic seal 48 and metallic disc 53;
(6) horizontally at the clearance 56 between retaining ring 61 and metallic disc 53;
(7) vertically between metallic disc 53 and plastic seal 57;
(8) horizontally through grease hole 59 in plastic seal 57;
(9) vertically between plastic seal 57 and shoulder 77 of retaining member 40;
(10) horizontally between retaining ring 63 and largest portion 47 of retaining member 40; and
(11) vertically between shoulder 79 of retaining member 41 and flange 65 of retaining member 40.

It will be realized that the construction of the above labyrinth lubrication channel will allow only enough lubricant at the end of the channel to define a dustproof seal without leakage of the lubricant outside of the channel.

Although specific embodiments of this invention have just been described, it will be understood that various modifications are permissible within the spirit of the invention, the scope of which is to be determined from the appended claims only.

I claim:

1. In an idler roller combination of the type including a pulley having a cylindrical central bearing support mounted over a stationary shaft co-axial with said support, said pulley formed with a central end-bore defining chamber, a bearing over said shaft supporting said pulley and at the internal end of said bore, means to introduce lubricant under pressure within said chamber and retainer means at the external end of said chamber to prevent axial movements of said bearing, the improvement which comprises a dustproof bearing assembly provided with an annular lip-type plastic seal adjacent the external end of said bearing but spaced therefrom to define therewith a lubrication channel, said annular lip-type plastic seal being fixedly mounted between an inner annular ring spacer and a first outer annular retaining ring, the lip of said annular lip-type plastic seal being slanted toward said annular ring spacer and resting thereon to close said lubrication channel when the lubricant circulates in one direction toward the end of said channel but capable of opening when the lubricant circulates in the opposite direction, a cylindrical retaining member mounted at the external end of said shaft to retain said bearing against said internal end of said bore to prevent longitudinal movement of said bearing on said shaft, a metallic disc fixedly mounted on said shaft between the internal end of said cylindrical retaining member and the external end of said inner annular ring spacer, said metallic disc having a clearance between its outer periphery and a second annular retaining ring adjacent said first retaining ring, a third annular retaining ring for containing said first and second annular rings and also spaced annular elements mounted about said cylindrical retaining member, said spaced annular elements defining an extension of the lubrication channel, said third annular retaining ring terminating in an external inwardly depending flange abutting said cylindrical member at the external end thereof, so constructed and arranged that the pressure required to inject said lubricant within said labyrinth lubrication channel will allow enough lubricant at the end of said channel to define a dustproof seal without leakage outside of said channel.

2. In an idler roller combination of the type including a pulley having a cylindrical central bearing support mounted over a stationary shaft co-axial with said support, said pulley formed with a central end-bore defining chamber, a bearing over said shaft supporting said pulley and at the internal end of said bore, means to introduce lubricant under pressure within said chamber and retainer means at the external end of said chamber to prevent axial movement of said bearing, the improvement which comprises a dustproof bearing assembly provided with first means adjacent the external end of said bearing but spaced therefrom to define therewith a lubrication channel, means to close said channel when the lubricant circulates in one direction toward the external end of said channel but capable of opening when the lubricant circulates in the opposite direction, a cylindrical retaining member mounted at the external end of said shaft to retain said bearing against said internal end of said bore to prevent longitudinal movement of said bearing on said shaft, spaced annular elements, so arranged to define therebetween a further continuous portion of said lubrication channel, said spaced annular elements mounted about said cylindrical member inside an annular retaining ring, said ring terminating in an external inwardly depending flange abutting said cylindrical member at the external end thereof, so constructed and arranged that the pressure required to inject said lubricant within said labyrinth lubrication channel will allow enough lubricant at the external end of said channel to define a dustproof seal without leakage of said lubricant outside of said channel.

3. An idler roller according to claim 2, wherein said first means comprises an annular lip-type plastic seal fixedly mounted between an inner annular ring spacer and an outer annular retaining ring.

4. An idler roller according to claim 3, wherein said inner annular ring spacer is made of metallic material.

5. An idler roller according to claim 3, said means to close said channel including a lip on said annular lip-type plastic seal.

6. An idler roller according to claim 5, wherein the tip of said lip rests on said inner annular ring spacer.

7. An idler roller as defined in claim 2, comprising a metallic disc fixedly mounted on said shaft between said cylindrical member and said inner annular ring spacer, said metallic disc having a clearance at its outer periphery to define a horizontal portion of said labyrinth lubrication channel.

References Cited

UNITED STATES PATENTS 3,239,284 3/1966 Cina et al. _____ 308—187 X
3,239,285 3/1966 Madeira et al. _____ 308—187 X

FOREIGN PATENTS 953,597 12/1956 Germany.
1,057,778 11/1953 France.

CARROLL B. DORITY, JR., *Primary Examiner.*

U.S. Cl. X.R.

308—18, 20